(12) United States Patent
Pilo et al.

(10) Patent No.: US 12,512,151 B1
(45) Date of Patent: Dec. 30, 2025

(54) MEMORY WITH HYBRID WRITE ASSIST SCHEME

(71) Applicant: Synopsys, Inc., Sunnyvale, CA (US)

(72) Inventors: Harold Pilo, Underhill, VT (US); Anurag Garg, Cupertino, CA (US); Michael Lee, South Burlington, VT (US)

(73) Assignee: Synopsys, Inc., Sunnyvale, CA (US)

( * ) Notice: Subject to any disclaimer, the term of this patent is extended or adjusted under 35 U.S.C. 154(b) by 108 days.

(21) Appl. No.: 18/415,614

(22) Filed: Jan. 17, 2024

(51) Int. Cl.
*G11C 11/419* (2006.01)

(52) U.S. Cl.
CPC ................ *G11C 11/419* (2013.01)

(58) Field of Classification Search
CPC .... G11C 11/412; G11C 11/418; G11C 11/419
USPC ......................................................... 365/154
See application file for complete search history.

(56) References Cited

U.S. PATENT DOCUMENTS

| | | | | |
|---|---|---|---|---|
| 8,345,504 | B2* | 1/2013 | Chuang | G11C 11/413 365/226 |
| 8,379,465 | B2* | 2/2013 | Clinton | G11C 11/413 365/189.11 |
| 9,251,875 | B1* | 2/2016 | Atallah | G11C 7/22 |
| 9,449,656 | B2* | 9/2016 | Huang | G11C 5/147 |
| 2012/0049374 | A1* | 3/2012 | Chang | H10D 89/10 257/E23.079 |
| 2012/0281459 | A1* | 11/2012 | Teman | G11C 11/413 365/156 |
| 2014/0233330 | A1* | 8/2014 | Ko | G11C 11/419 365/189.16 |

* cited by examiner

*Primary Examiner* — Sung Il Cho
(74) *Attorney, Agent, or Firm* — Andrew L. Dunlap; Haynes Beffel & Wolfeld LLP

(57) ABSTRACT

A method and circuit are provided for maintaining an operating voltage on a selected column with a plurality of bitcells in a memory when writing to the selected column. The method includes during an active write operation to the selected column, implementing an NMOS transistor NC to allow a bitcell-supply self-discharge (BSSD) to occur on the selected column, wherein the BSSD occurs by connecting a first drain voltage to an operating voltage connection of the selected column via the NMOS transistor NC to allow discharge of the operating voltage connection while limiting over-discharge of the selected column. The method further includes a PMOS select transistor PS to connect a second drain voltage to the operating voltage connection of the unselected column.

20 Claims, 9 Drawing Sheets

MEMORY WITH HYBRID WRITE ASSIST SCHEME

TECHNICAL FIELD

The present invention relates to write operations of static random access memory (SRAM). More particularly the present invention relates to reducing limitations caused during low voltage and high voltage write operations in a SRAM.
Harold

BACKGROUND

Static random access memory (static RAM or SRAM) is a type of random access memory (RAM) that is volatile and uses latching circuitry (flip-flop) to store each bit. For example, a SRAM flip-flop that stores a bit can require 6 transistors. SRAM can hold its data permanently in the presence of power and be used as cache for a central processing unit (CPU). It is desirable to reduce the memory cell size of SRAM bitcells. However, as with any semiconductor technology, this reduction of the size can impact the performance and operating voltage.

SUMMARY

Embodiments provide a method and circuit for improving the operating voltage on a selected column with a plurality of bitcells in a memory when writing to the selected column and prevent disturbing the programming condition on an unselected column.

Embodiments of the method include during an active write operation to the selected column, implementing an NMOS transistor NC to allow a bitcell-supply self-discharge (BSSD) to occur on the selected column, wherein the BSSD occurs by connecting a first drain voltage to an operating voltage connection of the selected column via the NMOS transistor NC to allow discharge of the operating voltage connection while limiting over-discharge of the selected column. The method further includes during the active write operation to the selected column, preventing floating of the operating voltage connection of an unselected column by implementing a PMOS select transistor PS to connect a second drain voltage to the operating voltage connection of the unselected column.

Embodiments of the method further support write-masking operations and circuitry and preventing floating of the operating voltage connection of the unselected column. The write-masking circuitry uses one or more additional PMOS transistors PB in parallel with the PMOS select transistor, the one or more additional PMOS transistors connecting the second drain voltage to the operating voltage connection of the unselected column.

Embodiments of circuitry include a BSSD circuit provided for maintaining an operating voltage for a selected column and an unselected column in a plurality of columns during an active write to the selected column. The BSSD circuit includes an NMOS transistor (NC) having a source-drain path connecting a first drain voltage to an operating voltage for the selected column, and having a gate receiving a write enable signal (WPASS), wherein during an active write enable the NMOS transistor NC discharges the operating voltage connection while limiting over-discharge. The BSSD circuit further includes a PMOS transistor (PS) having a source-drain path connecting a second drain voltage connection to the operating voltage connection for the unselected column, and having a gate receiving the write enable signal (WPASS), wherein the PMOS transistor PS prevents floating of the operating voltage connection by discharging excess voltage on the operating voltage connection while limiting over-discharge.

Embodiments of circuitry further include write-masking circuitry to prevent floating of the operating voltage connection during the active write. The write-masking circuitry includes one or more PMOS transistors (PB) with source-drain paths in series between the second drain voltage and the operating voltage connection of the selected column, and gates connected to global write enable line signals GW.

Embodiments further include a non-transitory computer readable medium comprising stored instructions, which when executed by a processor to maintain an operating voltage on a selected column of a plurality of columns in a memory during an active write operation to the selected column, cause the processor to perform operations. The operations include, during an active write operation to the selected column, implementing an NMOS transistor NC to allow a bitcell-supply self-discharge (BSSD) to occur on the selected column, wherein the BSSD occurs by connecting a first drain voltage to an operating voltage connection of the selected column via the NMOS transistor NC to allow discharge of the operating voltage connection while limiting over-discharge of the selected column. The operations further include, during the active write operation to the selected column, preventing floating of the operating voltage connection of an unselected column, of the plurality of columns, by implementing a PMOS select transistor PS to connect a second drain voltage to the operating voltage connection of the unselected column.

Embodiments of the non-transitory computer readable medium further include stored instructions to cause the processor, during the active write operation to the selected column, prevent floating of the operating voltage connection of the unselected column by implementing write-masking circuitry with one or more additional PMOS transistors PB in parallel with the PMOS select transistor, the one or more additional PMOS transistors connecting the second drain voltage to the operating voltage connection of the unselected column.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the disclosure provide a memory with a hybrid write assist scheme.

Problems exist due to process scaling that impacts the SRAM operation voltage that pose challenges. One challenge is that scaling to reduce overall memory size can cause high bitline resistance due to the reduction in metal thickness. Stronger bitcell pull-up (PU) transistors in the bitcells can also affect writeability.

Further, problems are caused by these challenges due to limits of a negative bitline write assist (NBL) technique and a transient voltage collapse (TVC) prevention technique that can be implemented to solve the challenges. The NBL and TVC prevention techniques do not provide the required margin for high voltage and low voltage operations. The NBL write assist technique fails to address the high voltage operating range resulting from stronger bitcell PU transistors and high bitline resistance. The TVC prevention technique fails to address a low voltage range as too low of a voltage is required to write to a bitcell, affecting data retention in unselected columns (of bitcells).

Solutions to these problems are provided by embodiments that combine a newly developed bitcell supply self-discharge (BSSD) scheme with a new NBL write assist scheme to resolve high voltage and low voltage writability challenges. The BSSD scheme helps resolve high voltage write limitations by weakening the effects of strong bitcell PU and high bitline resistance. A combination of the BSSD scheme and the new NBL write assist scheme helps resolve the low voltage write limitations.

Advantages provided by this solution include the ability to overcome high voltage and low voltage writeability limitations when memory is significantly scaled down. Further, advantages provided by this solution include that the BSSD scheme circuitry has a very low overhead of 4 Contacted Poly Pitches. The size of the NBL assist scheme can be reduced if used in combination with the BSSD. The combined scheme results in an overall lower area solution with improved writability.

Figure 1:
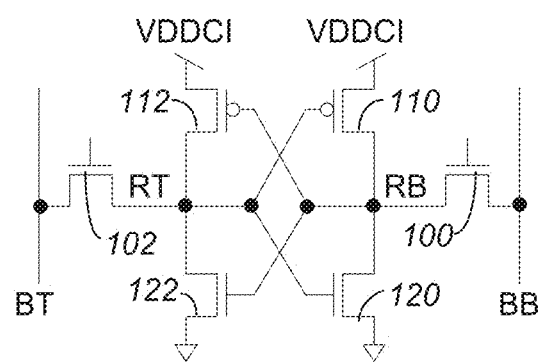
FIG. 1 shows circuitry for a bitcell connected in a column of bitcells in and SRAM memory for the purpose of illustrating voltage conditions that can occur during a write operation.

FIG. 1 shows circuitry for a bitcell connected in a column of bitcells in and SRAM memory for the purpose of illustrating voltage conditions that can occur during a write operation. The bitcell of FIG. 1 is connected to the bitline, bitline true (BT) and bitline bar (BB), through transistors 100 and 102. PMOS pull up transistors 110 and 112 connect the memory operating voltage VDDCI connection to a source drain path to bitcell nodes RT and RB. NMOS transistors 120 and 122 are connected with a source drain path from respective nodes RT and RB to VSS. The gates of transistors 110 and 120 are connected together to the node RT. The gates of transistors 112 and 122 are connected together to node RB.

With process scaling to reduce the size of transistors in the memory cell of FIG. 1, the bitlines BB and BT resistance is increased. Strong PMOS PU transistors 110 and 112 are required to improve stability of the bitcell. The higher resistance bitline also prevents the node RB from reaching VSS. An NBL write assist circuit can be provided to further discharge the bitline BB or BT. In some cases with higher resistance bitlines, the NBL write assist does not discharge the bitlines so the system is not able to write the bitcell through nodes RB and RT.

Figure 2:
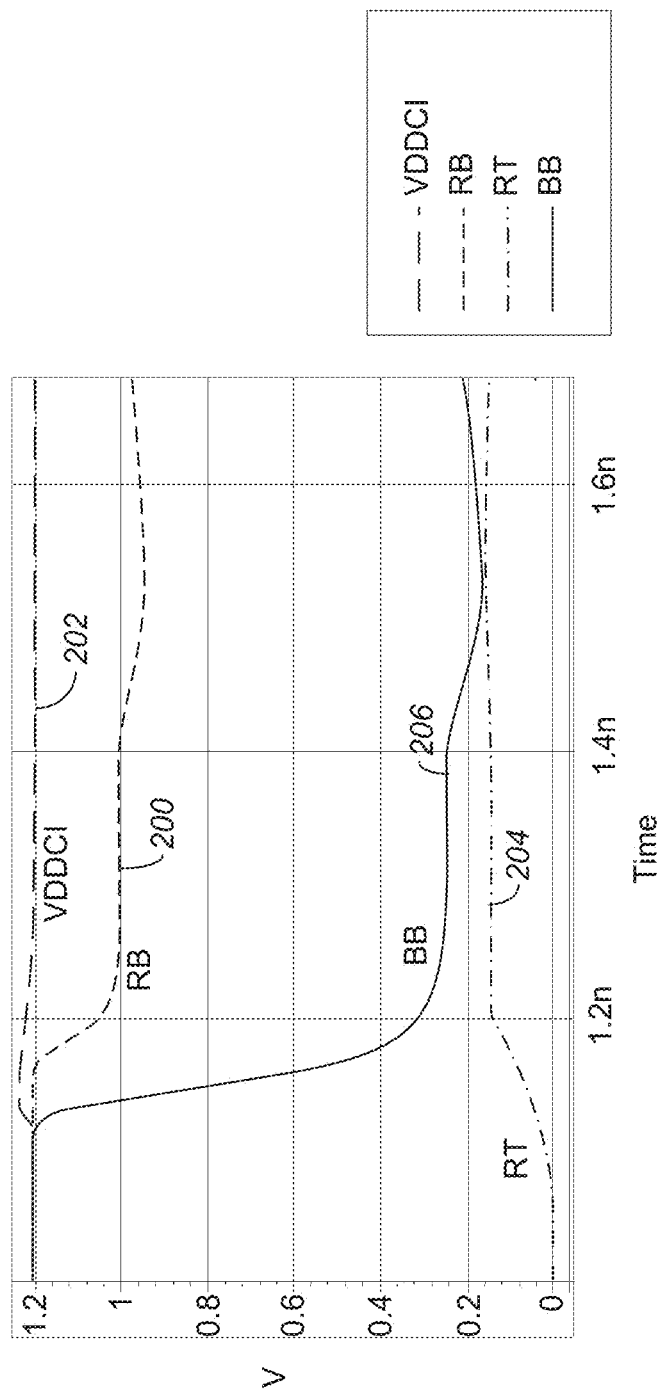
FIG. 2 provides a graph of voltages over time for the circuitry of FIG. 1.

FIG. 2 provides a graph of voltages over time for the circuitry of FIG. 1. The y axis shows voltage ranging from 0 to 1.2 volts, while the x axis shows time elapsed. FIG. 2 illustrates conditions that exist that can cause a high voltage write failure to occur. As shown by the RB node voltage 200, a high resistive bitline and strong pull up transistors 110 and 112 can prevent RB from discharging to VSS. Similarly the RT voltage line 204 shows that RT can in some conditions not be pulled up to VDDCI. The BB voltage line 206 shows how the bitline BB voltage is affected by RB not discharging to VSS and RT not transitioning to VDDCI even with a NBL write assist.

Figure 3:
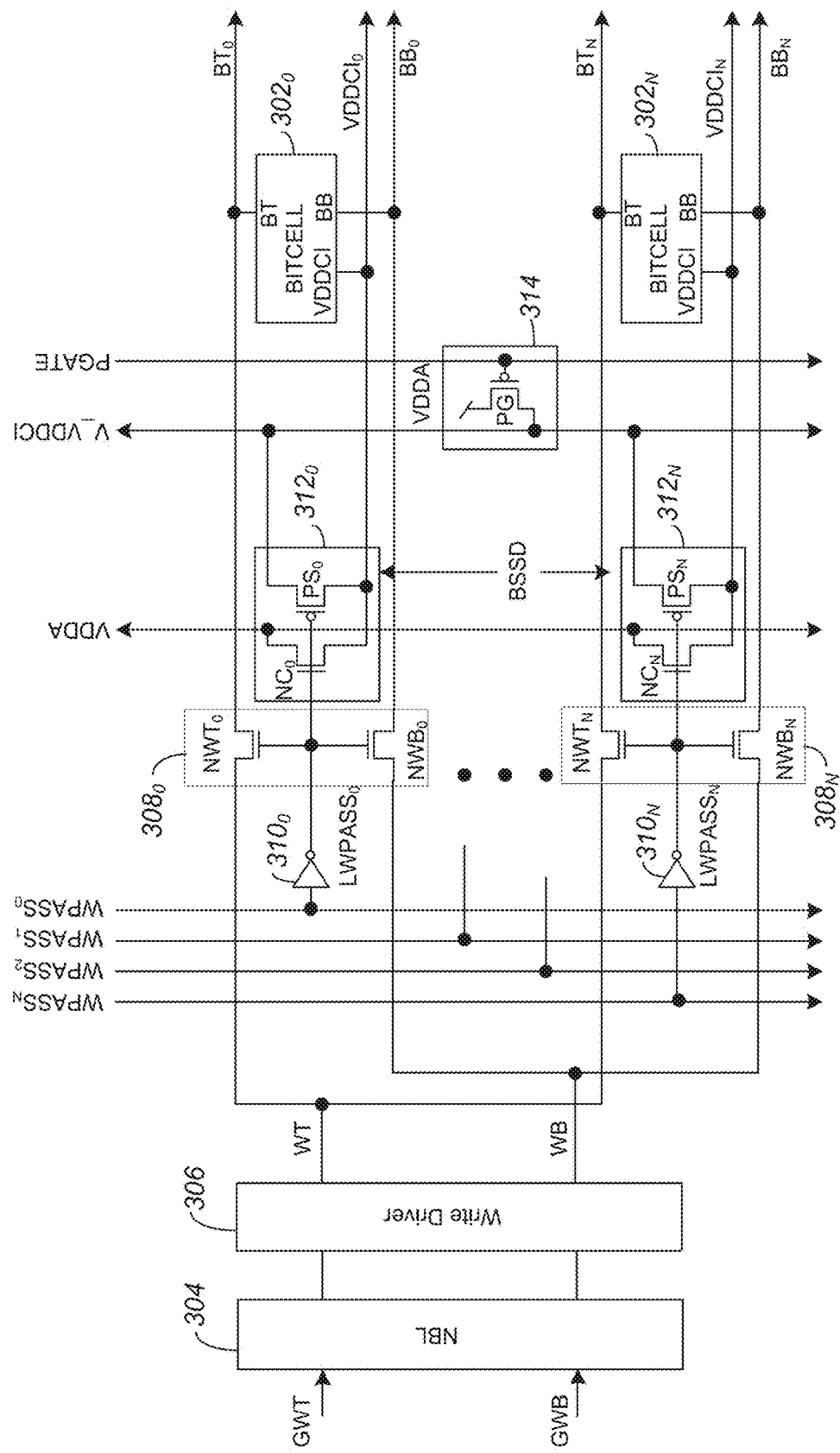
FIG. 3 shows detailed circuitry for writing to bitcells in a column of bitcells including circuit components for providing a bitcell-supply self-discharge (BSSD) according to embodiments to resolve high voltage and low voltage writability challenges described herein.

FIG. 3 shows detailed circuitry for writing to bitcells in a column of bitcells including circuit components for providing BSSD according to embodiments to resolve high voltage and low voltage writability challenges described herein. The circuit of FIG. 3 includes bitcells $302_0$-$302_N$ that contain the circuitry shown in FIG. 1. Each of the bitcells $302_0$-$302_N$ are connected to respective bitlines $BT_{0-N}$ and $BB_{0-N}$. Each of the bitcells $302_0$-$302_N$ are further connected to the power supply or operating voltage $VDDCI_{0-N}$.

Inputs to the circuit include global write enable signals GWB, GWT applied to a negative bit line (NBL) write assist circuit 304. The NBL write assist circuit 304 output is provided to a write driver circuit 306 which in response provides write signals WT and WB which are provided on write lines BB, BT. The WT and WB signals then provide memory write operation control to the respective bitlines BB and BT of the bitcells $302_0$-$302_N$ through the respective source to drain paths of pass transistors $NWT_{0-N}$ and $NWB_{1-N}$ in respective write pass enable circuits $308_0$-$308_N$. Thus, the memory write operation control circuit for each column includes NMOS transistors (NW) $308_0$-$308_N$ having a source-drain path connecting one of bit cell bitlines BB, BT to respective write lines WB, WT and having a gate connected to receive the write enable signal WPASS.

Inputs to select the columns for writing include write pass (WPASS) signals $WPASS_{0-N}$. The respective WPASS signals $WPASS_{0-N}$ are provided through inverters $310_{0-N}$ to generate signals $LWPASS_{0-N}$. The $LWPASS_{0-N}$ signals then drive the gates of transistors in the write pass enable circuits $308_0$-$308_N$. The $LWPASS_{0-N}$ signals also drive the gates of NMOS transistors $NC_{0-N}$ and PMOS transistors $PS_{0-N}$ which form the BSSD control transistor circuits $312_0$-$312_N$ for each column.

The transistors $NC_{0-N}$ in the BSSD control transistors circuits $312_0$-$312_N$ provide bitcell-supply self-discharge during writing to a bitcell by connecting a first drain voltage VDDA to a bitcell column operating voltage connection VDDCI of the bitcells $302_0$-$302_N$. The $NC_{0-N}$ transistors have source drain paths connecting the first drain voltage VDDA to the VDDCI connection of respective bitcells $302_0$-$302_N$. During an active write signal WPASS the active $NC_{0-N}$ transistor for the bitcell allows discharge of the VDDCI connection of the bitcell during the writing while preventing over-discharge that can drop operating voltage VDDCI to an unacceptable value that might affect nonactive bitcells. The $NC_{0-N}$ transistors are sized to provide a threshold voltage Vt to prevent the over-discharge of the operating voltage connection of a selected column.

To prevent floating of the VDDCI connection of an unselected column during writing, PMOS transistors $PS_{0-N}$ provide bitcell-supply self-discharge control by connecting a second drain voltage V_VDDCI to the VDDCI connection of unselected columns that do not receive the active write signal WPASS. The $PS_{0-N}$ transistors have a source-drain path connecting the second drain voltage V_VDDCI that will maintain the voltage on the VDDCI connection and prevent floating.

PMOS power-gate (PG) transistor 314 is provided with a source to drain path connecting the first drain voltage VDDA to the second drain voltage V_VDDCI. The PMOS power gate transistor 314 has a gate voltage provided by a PGATE transistor voltage set to ensure the second drain voltage maintains a sufficient voltage on the VDDCI connection. The power gate transistor 314 operates to provide power to charge the second drain voltage V_VDDCI.

In operation with the circuitry of FIG. 3, during a write operation to a bitcell the inverted version of the WPASS signal, LWPASS, causes the active bitcell to connect to receive the write signal WT and WB through the WPASS NMOS transistor $NWT_{0-N}$ and NMOS transistor $NWB_{0-N}$. The inverted version of WPASS, LWPASS, also disables PMOS transistors $PS_{0-N}$ to disconnect the second drain voltage V_VDDCI from the VDDCI connection and enable NMOS transistors $NC_{0-N}$ to connect the first drain voltage VDDA to the VDDCI connection for inactive bitcells $302_{0-N}$. Connection of the first drain voltage VDDA to the VDDCI connection reduces bitcell PU Vgs to allow the bitline to discharge to VSS and the write cycle to complete without malfunction.

For unselected columns, the inverted version of the WPASS signal, LPASS, keeps the PMOS transistor $PS_{0-N}$ enabled to connect the second drain voltage V_VDDCI to the VDDCI connection of the inactive bitcells $302_{0-N}$.

Figure 4:
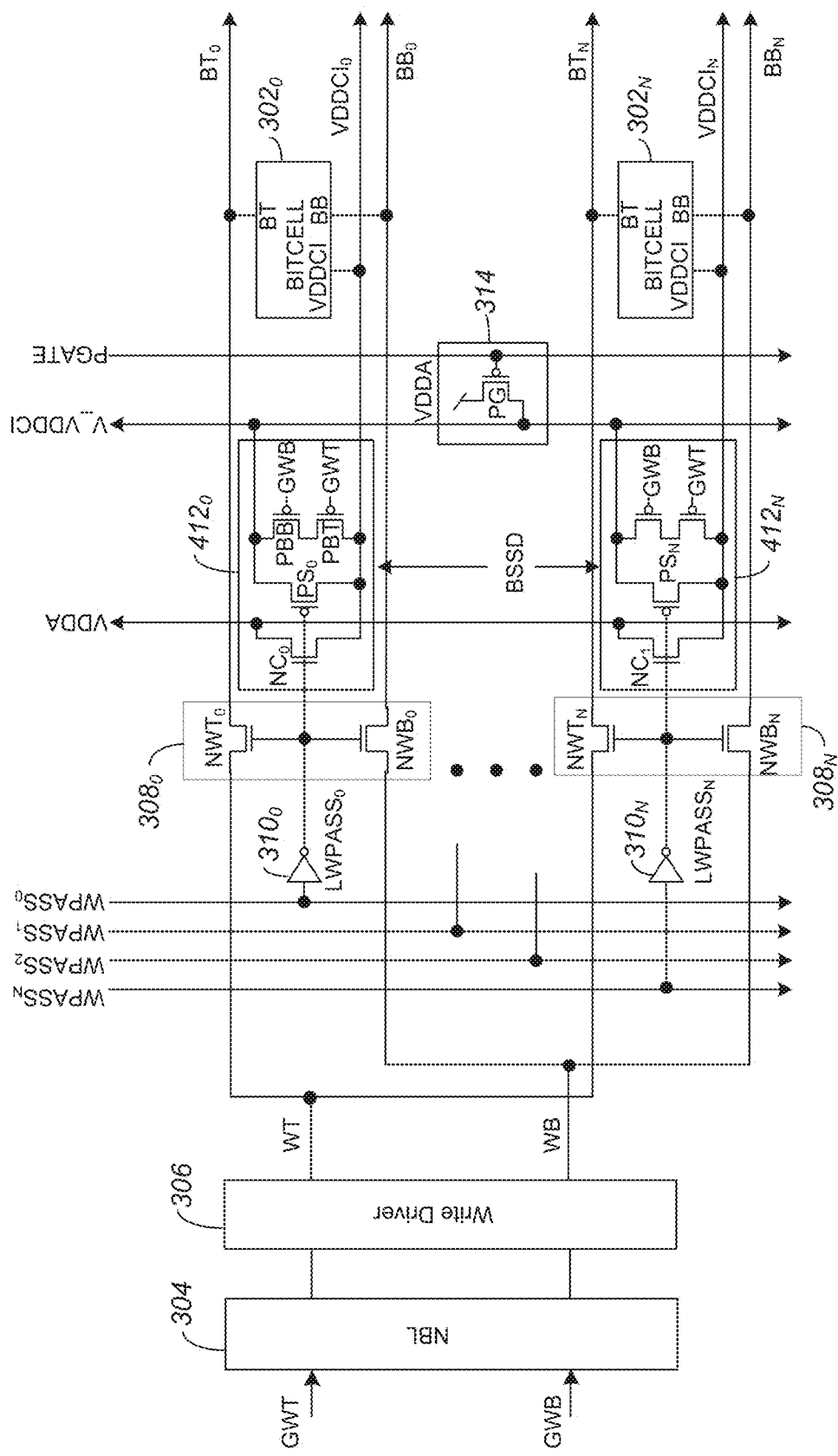
FIG. 4 shows circuitry added to the circuit of FIG. 3 to provide the write masking function to modify the NBL write assist according to embodiments.

FIG. 4 shows circuitry added to the circuit of FIG. 3 to modify the NBL write assist and provide a write-masking operation according to embodiments. Circuit components carried over from FIG. 3 are similarly labeled and their function is similar to that described with respect to FIG. 3. FIG. 4 modifies FIG. 3 by replacing the BSSD circuits $312_0$-$312_N$ with BSSD circuits $412_0$-$412_N$. The BSSD circuits $412_0$-$412_N$ of FIG. 4 additionally include additional PMOS transistors PBB and PBT to provide for the write-masking operation.

During a write masking operation, the power supply line for the selected column for writing should not be allowed to float when a wordline is active. The PMOS transistors PBB and PBT are added to the BSSD circuits $412_0$-$412_N$ to form a write masking circuit to prevent VDDCI to float while transistor $PS_0$ is disabled for the selected column. The transistors PBB and PBT have source drain paths connected in series, and the PBB and PBT series source drain paths are connected in parallel with the source drain paths of PMOS transistor $PS_{0-N}$. The GWB and GWT global write enable signals are both 0 during a write masking operation and turn on the PBB and PBT to connect the second drain voltage V_VDDCI to the VDDCI connection and prevent the VDDCI connection from being floated. The write masking operation to turn on PBB and PBT to prevent such floating forms part of a revised NBL write assist according for embodiments described herein. The write masking operation and new revised NBL write assist will be commonly referenced herein.

A power gate (PG) transistor 314 that serves to connect first drain voltage VDDA to the second drain voltage V_VDDCI in response to a power gate signal PGATE provided to its gate. The power gate transistor 314 ensures that the second drain voltage V_VDDCI is maintained at a desired level.

Figure 5:
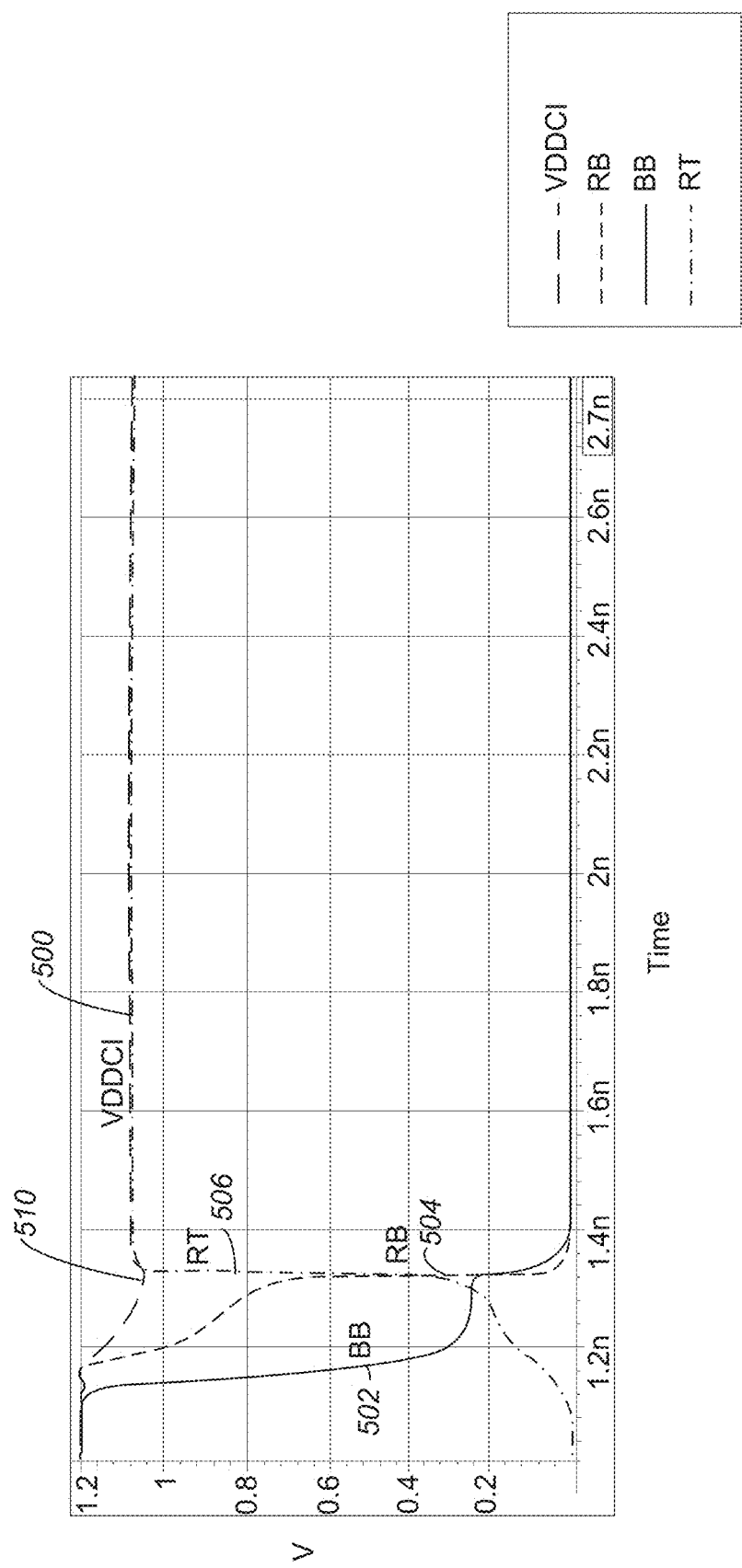
FIG. 5 provides a graph of voltages over time showing operation with the BSSD circuitry of FIG. 3 during programming of a bitcell.

FIG. 5 provides a graph of voltages over time showing operation with the BSSD circuitry of FIG. 3 during the write operation at high voltage. The y axis shows voltage ranging from 0 to 1.2 volts, while the x axis shows time elapsed from 0 to 2.7 nanoseconds. The voltages shown include operating voltage VDDCI 500, a bitline voltage BB 502 of a cell being written and a voltage at the connection RB 504 of a transistor (100 in FIG. 1) in the bitcell connecting the bitline point BB to the bitcell and a voltage at the connection RT 506 of a transistor (102 in FIG. 1) in the bitcell connecting the bitline point BT to the bitcell. As shown, the bitcell during write discharges the VDDCI connection through strong pull up transistors through BB to discharge the bitcell RB node to VSS to allow writing to the bitcell. The BSSD circuit overcomes the VDDCI voltage provided through strong pull up transistors by pulling down the voltage with a slight dip as shown by point 510 in VDDCI on the graph. In the graph during writing of the bitcell, RB goes from VDDCI to VSS while BB does the same after a short delay relative to RB. The voltage RT provides the converse voltage to RB.

Figure 6:
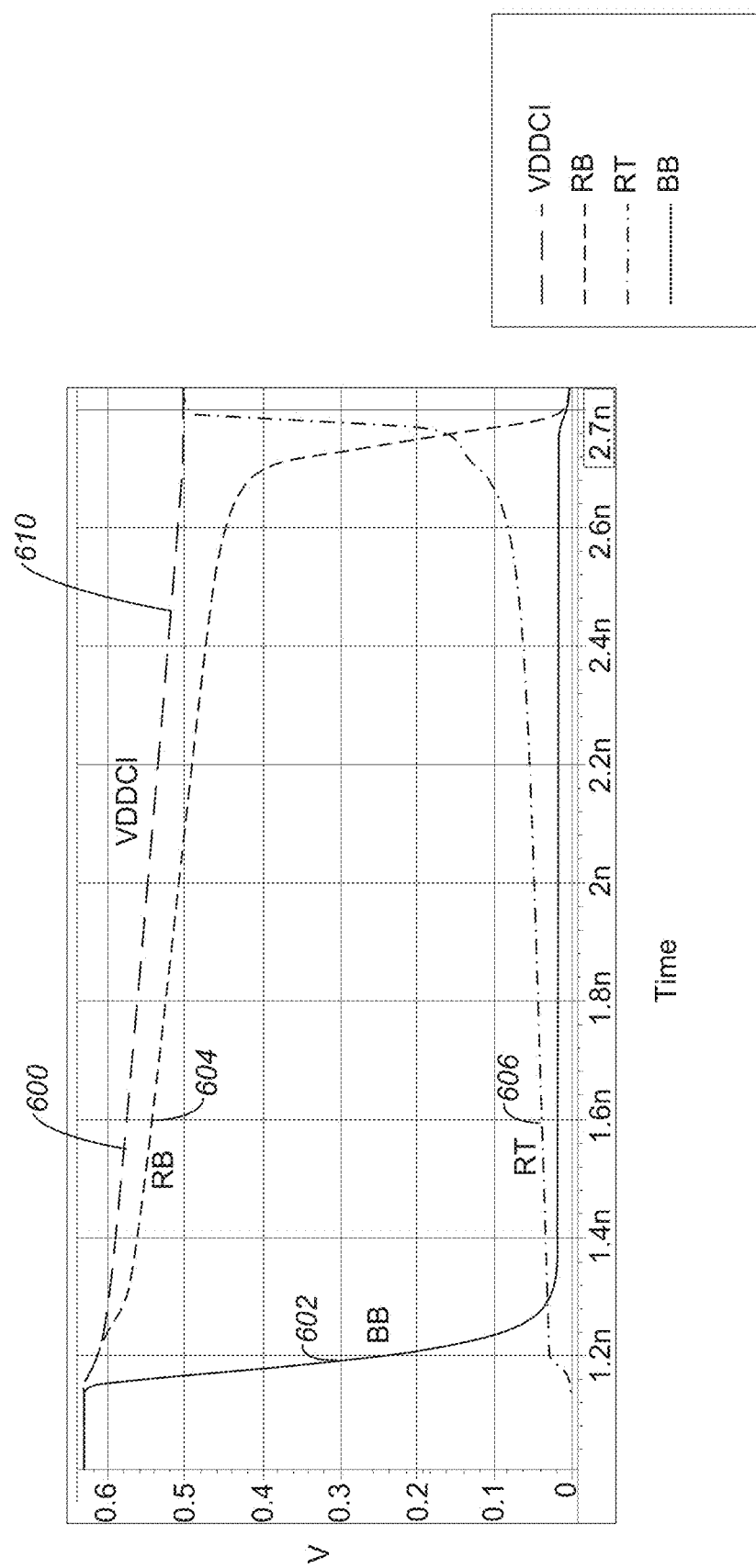
FIG. 6 provides a graph of voltages over time showing operation with the BSSD circuitry of FIG. 3 a short time after programming of a bitcell.

FIG. 6 provides a graph of voltages over a longer time period showing more of the write operation with the BSSD circuitry of FIG. 3 at low voltage. The y axis shows voltage ranging from 0 to 0.63 volts, while the x axis shows time elapsed from 0 to 2.7 nanoseconds. The voltages shown include VDDCI 600, a bitline voltage BB of a cell being written 602, the voltage at the connection RB 604 of a transistor (100 in FIG. 1) and the voltage 606 at the connection RT of the transistor (102 in FIG. 1). FIG. 6 shows the write operation to the bitcell, with the BSSD circuitry continuing to pull down the VDDCI level at later points 610 during the write operation. It can be noted from FIG. 6 that even though the write operation completes successfully at low voltage, the write time to complete the operation is much greater than in FIG. 5.

Figure 7:
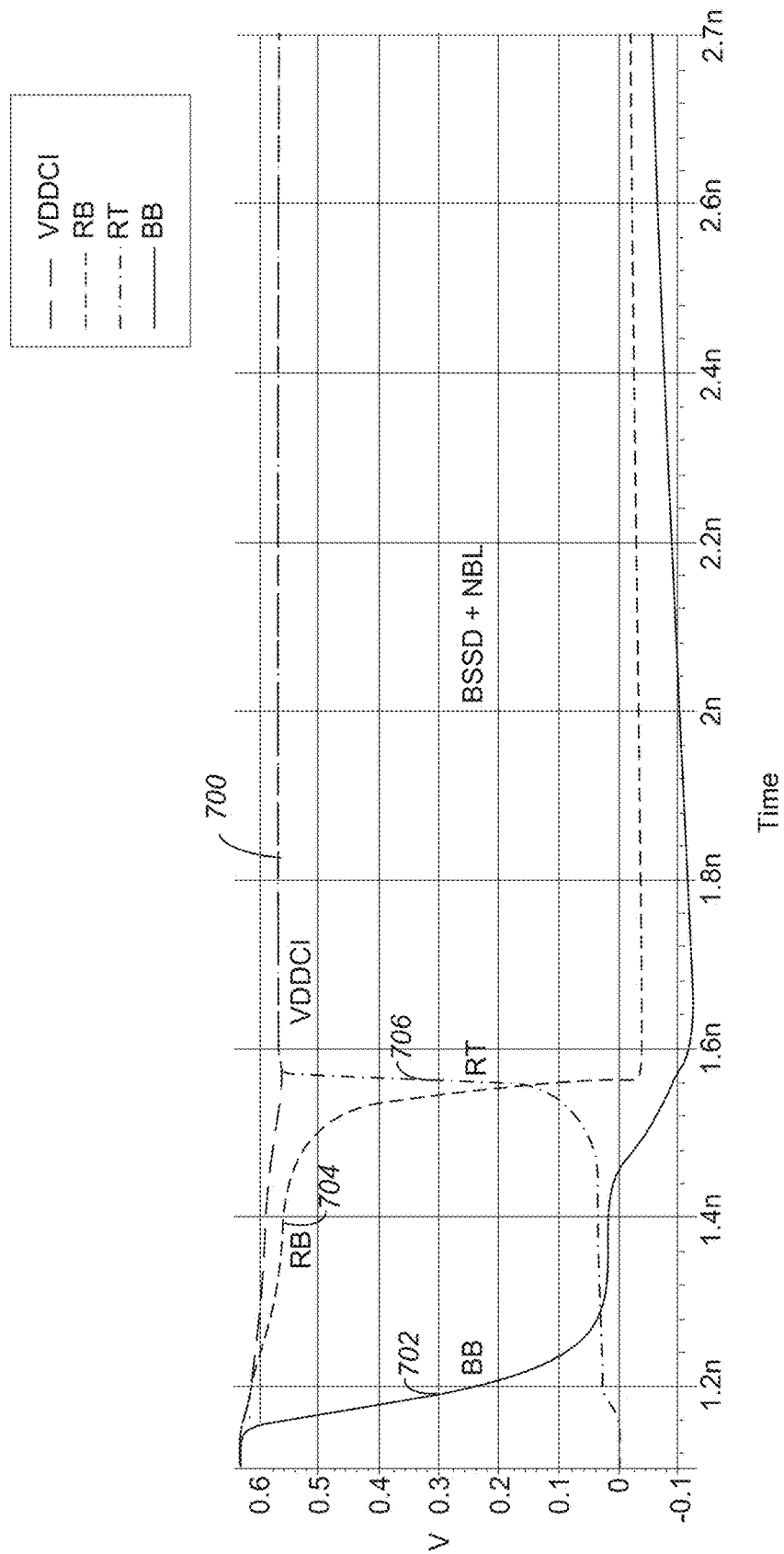
FIG. 7 shows a graph of voltages over time showing the effect of new NBL write assist or write masking circuitry combined with the BSSD circuitry of FIG. 3 or 4.

FIG. 7 shows a graph of voltages over time showing the effect of NBL write assist circuitry combined with the BSSD circuitry of FIG. 4. The combined BSSD circuitry and NBL write assist circuitry improves an operating voltage margin of the SRAM memory. The y axis shows voltage ranging from approximately −0.13 to 0.63 volts, while the x axis shows time elapsed from 0 to approximately 2.7 nanoseconds. FIG. 7 shows the combination of the BSSD scheme and NBL schemes together to show that the write time completes at low voltage much faster compared to the BSSD-only scheme shown in FIG. 6.

Thus, the BSSD combined with the NBL write assist improves low voltage operation. The voltages shown include VDDCI 700, a bitline voltage BB 702 of a cell being written, the voltage 704 at the connection RB of a transistor (100 in FIG. 1) and the voltage 706 at the connection RT of the transistor (102 in FIG. 1). As shown by VDDCI voltage line 700, the NBL write assist lowers the bitline voltage, BB, below VSS to provide a significant speed-up in the write operation.

In embodiments provided the BSSD circuitry and the write masking circuitry can be limited to four transistors per column.

Figure 8:
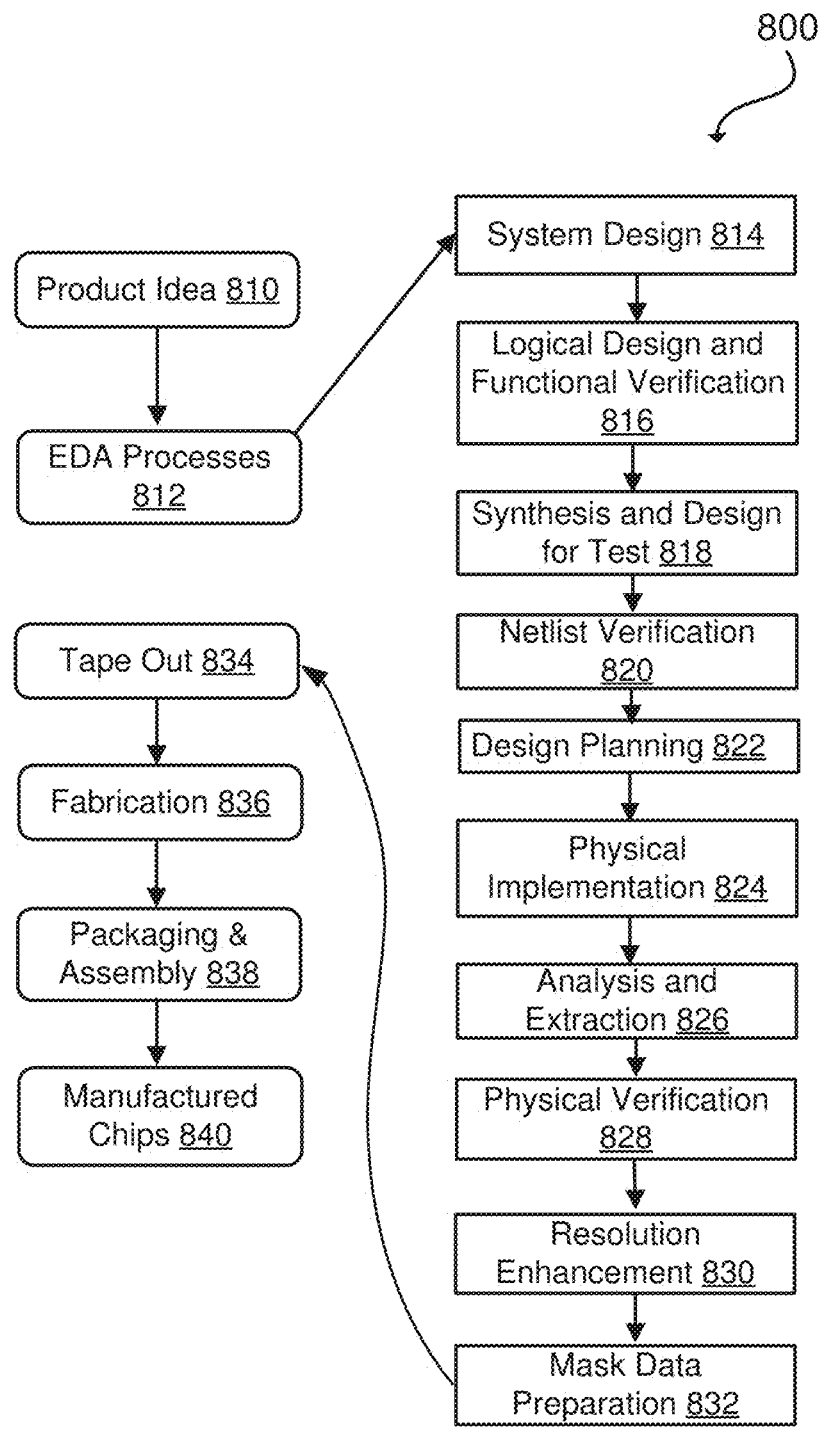
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 9:
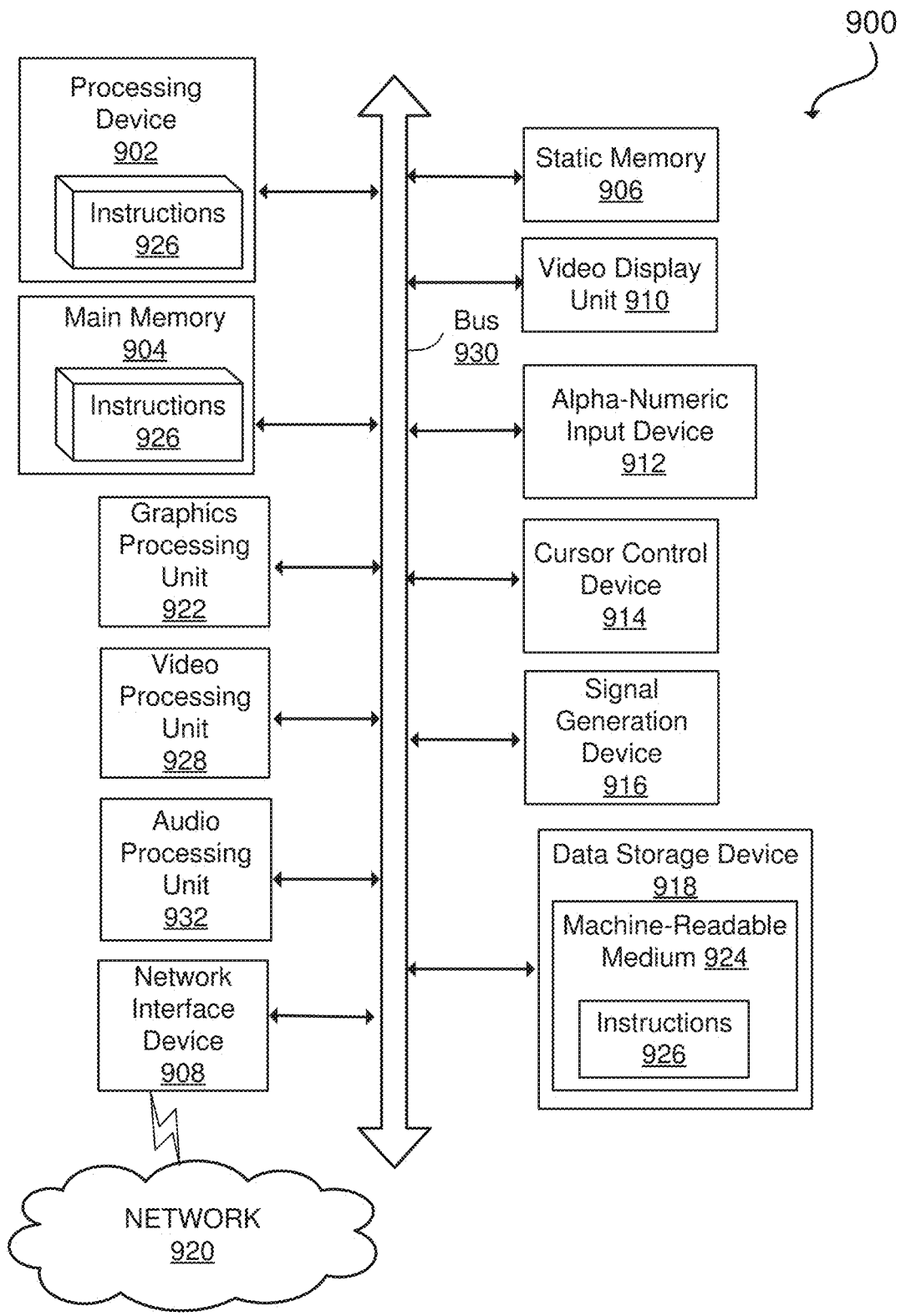
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Portions of the preceding detailed description require processes for programming and operation of SRAM memory that are implemented using algorithms and symbolic representations of operations on data bits within a computer memory to conduct operations. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

All of these and similar terms are to be associated with the appropriate physical quantities and are merely convenient labels applied to these quantities. Unless specifically stated otherwise as apparent, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of maintaining an operating voltage on a selected column with a plurality of bitcells in a memory, when writing to the selected column, the method comprising:
   during an active write operation to the selected column, implementing an NMOS transistor NC to allow a bitcell-supply self-discharge (BSSD) to occur on the selected column, wherein the BSSD occurs by connecting a first drain voltage to an operating voltage connection of the selected column via the NMOS transistor NC to allow discharge of the operating voltage connection while limiting over-discharge of the selected column; and
   during the active write operation to the selected column, preventing floating of the operating voltage connection of an unselected column by implementing a PMOS select transistor PS to connect a second drain voltage to the operating voltage connection of the unselected column,
   wherein the second drain voltage is different from the first drain voltage, and the second drain voltage is provided based, at least in part, on the first drain voltage being controlled based, at least in part on, another voltage.

2. The method of claim 1, further comprising:
   during the active write operation to the selected column, preventing floating of the operating voltage connection of the selected column by implementing write-masking circuitry using one or more additional PMOS transistors PB in parallel with the PMOS select transistor PS, the one or more additional PMOS transistors PB connecting the second drain voltage to the operating voltage connection of the selected column.

3. The method of claim 2 further comprising:
   during the active write operation to the selected column, providing a memory write operation control using two NMOS pass transistors NWT, NWB each having a source-drain path connecting one of bit cell bitlines BB, BT to respective write lines WB, WT; and
   providing a global write enable signals GW to the one or more additional PMOS transistors PB connecting the second drain voltage to the operating voltage connection of the unselected column.

4. The method of claim 3, wherein the BSSD resolves high voltage write limitations by weakening an effect of a bitcell pullup in the bitcells on the bit cell bitlines BB, BT during the active write operation and mitigating the effect of a high bitline resistance on the bit cell bitlines BB, BT.

5. The method of claim 4, wherein the BSSD combined with the write masking circuitry improves an operating voltage margin of the memory.

6. The method of claim 2, further comprising:
   during the active write operation to the selected column, providing power to charge the second drain voltage using a PMOS power gate PG transistor connecting the first drain voltage to the operating voltage connection of the selected column as controlled by a power gate voltage signal.

7. The method of claim 1, wherein the NMOS transistor NC is sized to provide a threshold voltage Vt to prevent the over-discharge of the operating voltage connection of the selected column.

8. The method of claim 1, further comprising:
   during an active write operation to the selected column, disconnecting the NMOS transistor NC from between the first drain voltage and the operating voltage connection during an inactive write operation to an unselected column; and
   disconnecting the PMOS transistor PS from between the second drain voltage and the operating voltage connection of the selected column during the active write operation.

9. The method of claim 1, wherein the unselected column has the operating voltage connection maintained at a voltage level of the second drain voltage by the PMOS transistor PS with gates receiving a write pass WPASS signal.

10. A circuit for maintaining an operating voltage in a memory, the circuit comprising:
    a bitcell-supply self-discharge (BSSD) circuit provided for maintaining the operating voltage for a selected column having an operating voltage connection and an unselected column having an operating voltage connection during an active write to the selected column, the BSSD circuit comprising:
    an NMOS transistor NC having a source-drain path connecting a first drain voltage to the operating voltage connection of the selected column, and having a gate receiving a write enable signal WPASS, wherein during an active write the NMOS transistor NC discharges the operating voltage connection of the selected column while limiting over-discharge; and
    a PMOS transistor PS having a source-drain path connecting a second drain voltage to the operating voltage connection of the unselected column, and having a gate receiving the write enable signal WPASS, wherein the PMOS transistor PS prevents floating of the operating voltage connection of the unselected column by discharging excess voltage on the operating voltage connection of the unselected column while limiting over-discharge,
    wherein during the active write operation to the selected column, a memory write operation control is provided using two NMOS pass transistors NWT, NWB each having a source-drain path connecting one of bit cell bitlines BB, BT to respective write lines WB, WT.

11. The circuit of claim 10, further comprising:
    write-masking circuitry provided to prevent floating of the operating voltage connection of the selected column during the active write, the write-masking circuitry comprising:
    one or more PMOS transistors PB with source-drain paths in series between the second drain voltage and the operating voltage connection of the selected column, and gates connected to global write enable line signals GW.

12. The circuit of claim 11, wherein the BSSD and the write-masking circuitry are limited to four transistors per column.

13. The circuit of claim 10, further comprising:
    a memory write operation control circuit for each bitcell comprising:
    one or more NMOS transistors (NW) having a source-drain path connecting one of bit cell bitlines BB, BT to respective write lines WB, WT and having a gate connected to receive the write enable signal WPASS.

14. The circuit of claim 13, wherein the write enable signal WPASS is provided through an inverter to the gate of the NMOS transistor NC, the PMOS transistor PS, and the one or more NMOS transistors NW.

15. The circuit of claim 10, wherein the NMOS transistor NC is sized to provide a threshold voltage Vt to prevent the over-discharge of the operating voltage connection of the selected column.

16. The circuit of claim 10, further comprising:
a power gate PMOS transistor PG having a source drain path connecting the first drain voltage to the second drain voltage and having a gate connected receive a power gate voltage signal.

17. A non-transitory computer readable medium comprising stored instructions, which when executed by a processor to maintain an operating voltage on a selected column of a plurality of bitcells in a memory during an active write operation to the selected column, cause the processor to:
during an active write operation to the selected column, implementing an NMOS transistor NC to allow a bitcell-supply self-discharge (BSSD) to occur on the selected column, wherein the BSSD occurs by connecting a first drain voltage to an operating voltage connection of the selected column via the NMOS transistor NC to allow discharge of the operating voltage connection while limiting over-discharge of the selected column; and
during the active write operation to the selected column, preventing floating of the operating voltage connection of an unselected column by implementing a PMOS select transistor PS to connect a second drain voltage to the operating voltage connection of the unselected column,
wherein the second drain voltage is different from the first drain voltage, and the second drain voltage is provided based, at least in part, on the first drain voltage being controlled based, at least in part on, another voltage.

18. The non-transitory computer readable medium of claim 17, wherein the stored instructions further cause the processor to:
during the active write operation to the selected column, preventing floating of the operating voltage connection of the unselected column by implementing write-masking circuitry using one or more additional PMOS transistors PB in parallel with the PMOS select transistor PS, the one or more additional PMOS transistors PB connecting the second drain voltage to the operating voltage connection of the unselected column.

19. The non-transitory computer readable medium of claim 18, wherein the BSSD combined with the write masking circuitry further improves low voltage operation.

20. The non-transitory computer readable medium of claim 17, wherein the BSSD resolves high voltage write limitations by weakening an effect of pullup transistors in the plurality of bitcells and weakening an effect of a high bitline resistance.

* * * * *